(12) United States Patent
Brown

(10) Patent No.: US 6,755,925 B1
(45) Date of Patent: *Jun. 29, 2004

(54) METHOD OF RESISTING CORROSION IN METAL REINFORCING ELEMENTS CONTAINED IN CONCRETE AND RELATED COMPOUNDS AND STRUCTURES

(75) Inventor: Paul Brown, State College, PA (US)

(73) Assignee: 352 East Irvin Avenue Limited Partnership, State College, PA (US)

( * ) Notice: Subject to any disclaimer, the term of this patent is extended or adjusted under 35 U.S.C. 154(b) by 0 days.

This patent is subject to a terminal disclaimer.

(21) Appl. No.: 10/047,226

(22) Filed: Jan. 14, 2002

Related U.S. Application Data

(63) Continuation-in-part of application No. 10/044,660, filed on Jan. 9, 2002, which is a continuation-in-part of application No. 10/010,581, filed on Nov. 13, 2001, now Pat. No. 6,610,138.

(51) Int. Cl.[7] .......................... B32B 13/06; B32B 31/00; B32B 31/04
(52) U.S. Cl. .......................... 156/39; 52/741.41; 156/42; 264/36.2
(58) Field of Search .............................. 156/42, 45, 39; 264/36.2, 42; 52/414, 741.41, 742.14; 106/640, 641, 642, 643, 644

(56) References Cited

U.S. PATENT DOCUMENTS

| | | |
|---|---|---|
| 5,049,412 A | 9/1991 | Miller |
| 5,198,082 A | 3/1993 | Vennesland et al. |
| 5,422,141 A * | 6/1995 | Hoopes et al. ............... 427/299 |
| 5,435,846 A * | 7/1995 | Tatematsu et al. .......... 106/813 |
| 6,402,990 B1 * | 6/2002 | Marazzani et al. .... 252/389.31 |

FOREIGN PATENT DOCUMENTS

| | | | |
|---|---|---|---|
| CA | 1258473 | * 8/1989 | ........... C04B/40/00 |
| JP | 9-286652 | * 11/1997 | ........... C04B/28/02 |

* cited by examiner

*Primary Examiner*—Steven D. Maki
(74) *Attorney, Agent, or Firm*—Debra Z. Anderson; Arnold B. Silverman; Eckert Seamans Cherin Mellott, LLC

(57) ABSTRACT

In some embodiments, alternate sources of aluminum or calcium are provided in various ways including the desired compounds. The further object of the present invention contemplate in situ creation of the compound in interest in fresh concrete and as a slurry which can be employed in remediation of existing concrete structures. A method of resisting corrosion in concrete containing metal elements is provided. It includes introducing into fresh concrete, containing metal elements, at least one compound capable of sequestering chloride ions. The method may also involve employing a compound which is capable of establishing a corrosion resistant oxide layer on the metal reinforcing elements. The invention also includes certain compounds which may be employed in the method as well as concrete structures containing the compounds. In another embodiment of the invention, concrete structures may be rehabilitated by providing an overlay containing a compound of the type which will contribute to corrosion resistance either through chloride ion sequestering or creating barriers around metal structural elements with the overlay being provided in situ or as a preformed member and with possible use of a slurry in combination with an overlay segment. In another embodiment, a source of alumina is combined in solution with $Ca(NO_2)_2$ and/or $NaNO_2$ with the resultant solution being introduced into the pores of a concrete structure, preferably under pressure to cause them to react with each other and with $Ca(OH)_2$ contained within the concrete to produce the desired corrosion inhibiting compound.

12 Claims, 2 Drawing Sheets

METHOD OF RESISTING CORROSION IN METAL REINFORCING ELEMENTS CONTAINED IN CONCRETE AND RELATED COMPOUNDS AND STRUCTURES

CROSS REFERENCE TO RELATED APPLICATION

This application is a continuation-in-part of U.S. Ser. No. 10/044,660 entitled "A METHOD RESISTING CORROSION IN METAL REINFORCING ELEMENTS CONTAINED IN CONCRETE AND RELATED COMPOUNDS AND STRUCTURES" in the name of Paul W. Brown filed on Jan. 9, 2002, which is a continuation-in-part of U.S. Ser. No. 10/010,581, filed Nov. 13, 2001 now U.S. Pat. No. 6,610,138.

BACKGROUND OF THE INVENTION

1. Field of the Invention

The present invention relates to a method of introducing into fresh concrete, as herein defined, compounds capable of sequestering chloride ions to establish resistance to corrosion of metal reinforcing elements contained within or contacting the concrete and provide a corrosion resistant oxide layer on the metal reinforcing elements, as well as related compositions and structures. The invention is also directed toward corrosion protection of concrete articles wherein the concrete has already set and hardened.

2. Description of the Prior Art

The advantageous use of metal reinforcing members, such as steel reinforcing members, in concrete for structural uses has been known for many years. Concrete is known to provide desired compressive strength, but tends to lack tensile strength. The reinforcing bars co-act with the concrete to provide enhanced tensile strength for the combination of materials. It has also been known to employ corrugated metal deck in combination with concrete to create a composite with similar benefits. Numerous other metal members have been embedded in concrete or provided in contact therewith to achieve enhanced benefits in the structural environment as a result of such materials. Among these additional materials are grids, beams, bolts, hold-downs and wire mesh.

One problem with such construction has arisen as a result of exposure of concrete to salts, such as calcium chloride and sodium chloride, on external structural members to resist the undesired accumulation of snow and ice on bridges and other concrete paved areas such as roadways, parking lots, sidewalks and the like. While these chloride salts do provide benefits in terms of de-icing of concrete surfaces, they frequently result in the chloride solutions migrating into the concrete decks and adjacent vertical concrete surfaces, such as walls and columns, also subjecting these to chloride intrusion. Also, saline seawater may migrate into the pores of concrete exposed to seawater as in sea walls, With respect to bridge decks, in particular, an enhanced problem results from air movement under the deck creating an environment wherein the salts are aspirated into the concrete and salt laden solutions flow into the pores.

Regardless of the manner in which chloride enters such concrete, the chloride, upon reaching the steel reinforcing members, tends to accelerate corrosion of the same because the oxidation of the metal metallic iron to $Fe^{2+}$ is catalyzed by the chloride. Also, oxides and hydroxides of $Fe^{2+}$ frequently form and occupy porosity in the vicinity of the interface of the steel and concrete. In addition, oxides and hydroxides of $Fe^{3+}$ may also be produced. As these iron oxides and hydroxides are of greater volume than the iron metal from which they were produced, they tend to cause internal stresses which may become high enough to crack the concrete, and also degrade the desired bond between the metal reinforcing elements and the concrete.

U.S. Pat. No. 5,049,412 discloses a method of re-alkalizing concrete in which carbonation has occurred. An outer layer of the concrete structure containing reinforcement which layer through exposure to air has been carbonated has an adjacent layer that remains relatively less carbonated. The patent discloses applying to the outer surface a water type adherent coating followed by introducing between the outer adjacent layers, water from a source external to the concrete structure and maintaining the concrete structure in this condition for a period of time sufficient to effect diffusion of the alkaline materials from the relatively less carbonated adjacent layer into the relatively carbonated outer layer.

U.S. Pat. No. 5,198,082 discloses a process for rehabilitation of internally reinforced concrete, which includes temporary application of an adhered coating of an electrode material to surface areas of the concrete. Distributed electrodes such as a wire grid is embedded in the coating. A voltage as applied to the reinforcement and distributed to the electrode to cause migration of chloride ions from the chloride into the electrolytic coding. Among the shortcomings of this approach are the need to provide, at the local source, a source of electrical power. This electrical equipment might have to be maintained at the site for extended periods of time. This further complicates matters by establishing a risk of injury to children and others that might find the equipment at an attractive nuisance, as well as the risk of theft and vandalism. Also, such chloride extraction processes may alter the concrete microstructure by making it more porous and permeable, thereby, facilitating enhanced re-entry of chloride when de-icing salts are again applied to the exterior.

It has been known to employ nitrites, such as calcium nitrite, in resisting corrosion of steel parts in concrete. It is believed that the nitrites oxidize the $Fe^{2+}$ to $Fe^{3+}$ which, in turn, precipitates as $Fe_2O_3$. The $Fe_2O_3$ thus formed tends to act as a barrier to further contact between the chloride and the steel. See, generally, U.S. Pat. Nos. 4,092,109 and 4,285,733. Neither calcium nitrate nor $Fe_2O_3$, however, function to sequester chloride. The latter provides merely a barrier.

There remains, therefore, a very real and substantial need for a method and related composition and structure which will resist undesired corrosion of metal structural elements contained within, or in contact with, concrete structural members.

SUMMARY OF THE INVENTION

The present invention has met the above-described need.

The method, in one embodiment, includes resisting corrosion in concrete containing metal reinforcing elements composed of steel, copper, galvanized steel, tin plated steel or other structurally suitable metals by introducing into fresh concrete containing metal reinforcing elements at least one compound capable of sequestering chloride ions in a low solubility compound.

In connection with steel reinforcing elements, a low solubility compound within which the chloride ions are sequestered preferably also is created in a reaction that releases nitrite, which serves to oxidize $Fe^{2+}$ to thereby provide a corrosion-resisting oxide layer on the steel reinforcing elements. This, therefore, in connection with steel achieves two levels of corrosion resistance, one of which is the actual capturing or sequestering of the potentially damaging chloride ions, and the second of which provides a protective layer on the metal reinforcing elements.

Among the preferred compounds for use in the method of the present invention are one or more compounds selected from the group consisting of $3CaO.Al_2O_3.Ca(NO_2)_2.nH_2O$; $3CaO.Al_2O_3.Ca(NO_3)_2.nH_2O$; and $3CaO.Fe_2O_3.Ca(NO_2)_2.nH_2O$; wherein n=0 to 24 and preferably 10 to 24, depending upon the relative humidity to which a compound is equilibrated. If desired, lower values of "n" may be obtained by drying at low relative humidity as by evacuation or by heating, for example.

A further compound employed in another embodiment of the invention is, $3Me(II)O.R_2O_3.Me(II)(anion)_2.nH_2O$ wherein Me(II) is one or more divalent cations, such as Ca for example, $R_2$ is $Al_2$, $Fe_2$ or $Cr_2$ anion is $NO_2$, $NO_3$, $CO_3$, $BO_4$ or OH and n is 0 to 24, and preferably 10 to 24. For some formulations, the anion may be divalent. In this case the formula would be $Me(II)O.R_2O_3Me(II)(anion)nH_2O$ wherein n is 0 to 18 and preferably 10 to 18.

The invention also contemplates a concrete structure which has hydrated fresh concrete and a plurality of metal structural elements in contact with the hydrated fresh concrete with a compound which sequesters chloride ions dispersed within the concrete.

The invention in another embodiment contemplates rehabilitation of existing concrete structures by providing a chloride sequestering compound in a member adjacent to the concrete structure and having a composition such that migration of chlorine ions away from metal structural elements in the concrete structure and into the adjacent overlay may be effected. In addition, if desired, release of nitrite to migrate into the concrete structure and afford corrosion protection to embedded steel.

In one version, the overlay, which may be formed in situ or as a preformed panel, contains the chloride-sequestering compound. In another, a slurry may be applied to the concrete structure with or without an overlay secured thereover.

The invention also contemplates in situ formations of the desired compounds which are suitable for either chloride ion sequestration and nitrite release in order to establish an oxide protective layer over the metal elements.

The compound may be formed by adding certain materials to fresh concrete with a reaction product of cement hydration yielding a further component or separately adding the component. The in situ concept may also be employed in remediation of existing concrete structures.

Alternate sources of aluminum for use in creating the compound may be provided.

In another approach, sources of calcium and aluminum may be provided separately or as an admixture introducing the desired compound.

It is an object of the present invention to provide a method and related compounds and structures for inhibiting corrosion of metal elements positioned within or in contact with concrete in a structural environment.

It is a further object of the present invention to provide such a system wherein undesired chloride ions will, as a result of a reaction, be sequestered, thereby reducing their ability to corrode the metal elements.

It is yet another object of the invention to, through a reaction effecting such sequestration of ions, to provide free nitrites which will oxidize the Fe2+ to a $Fe^3+$ion which, in turn, precipitates as $Fe_2O_3$ which coats the metal element and, thereby, resists corrosion.

It is yet another object of the present invention to provide such a system which employs unique compounds.

It is another object of the present invention to provide such a system which will effectively and rapidly provide corrosion resistance to steel and other metals.

It is yet another object of the invention to provide such a system which may be employed by merely adding one or more compounds of choice to fresh concrete without requiring substantial changes in conventional practices employed in producing and placing the concrete structure.

It is a further object of the present invention to provide such a system where an existing concrete structure may be rehabilitated through by sequestering the chloride and providing a means to accumulate nitrite ions in the vicinity of the embedded steel. It is appreciated that the nitrite ions oxidize presently corroding steel to produce a protective layer. In some formulations nitrite ions may not be available and in these instances rehabilitation is the result of chloride sequestration only.

It is yet another object of the present invention to provide such a system wherein an overlay, which contains a composition which may be of the type employed in other embodiments of the invention and facilitates sequestering of chloride and corrosion protection of metal structural elements. In another version, a slurry containing the compound of interest may be applied to the concrete structure with an overlay material either formed in situ or as a preformed panel secured thereover.

It is yet another object of the present invention to provide such a system for rehabilitation of existing concrete structures without requiring a source of electrical energy to be present on an ongoing basis during the performance of the method.

It is a further object of the present invention to provide for creation of the desired compound in situ in fresh concrete, or as a component, or with it, employed with one or more components employed in creating the fresh concrete.

It is yet another object of the present invention to provide in situ creation of the desired compound in the course of creating a slurry or preformed panel employed in remediation existing concrete structures.

It is yet another object of the present invention to provide for such in situ creation of the compound by adding certain materials either in solution or in the mixing water employed to prepare the concrete.

It is yet another object of the present invention to employ sources of aluminum other than calcium aluminate cement in creating the desired compound.

It is further an object of the present invention to provide alternate sources of calcium and aluminum in creating the desired compound.

These and other objects of the invention will be more fully understood from the following description of the invention with reference to the drawings appended hereto.

DESCRIPTION OF THE PREFERRED EMBODIMENT

As employed herein the term "concrete structure" refers to an existing structure which is composed in at least significant part of concrete which has set and hardened, as contrasted with "fresh concrete" as defined herein and shall expressly include, but not be limited to, bridges, roadways, parking lots, sidewalks, parking garages, floors, support columns, piers, marine structures, piling, conduits and other concrete structures whether located inside or outside, and whether subject to vehicular or foot traffic thereover or not.

As employed herein, the term "fresh concrete" means concrete which is in a plastic state.

As employed herein reference to "introducing" a compound into fresh concrete shall be deemed to include introducing the compound in solid form and in slurry form with or without other ingredients such as minerals and additives into fresh concrete and shall also embrace admixing or blending the composition in dry form with dry cement and/or other ingredients prior to water being added.

As employed herein, the term "metal elements" means metal elements placed within or in contact with concrete for various purposes including, but not limited to, structural purposes and shall expressly include, but not be limited to, reinforcing bars, grills, beams, metal deck hold downs and wire mesh.

Figure 1:
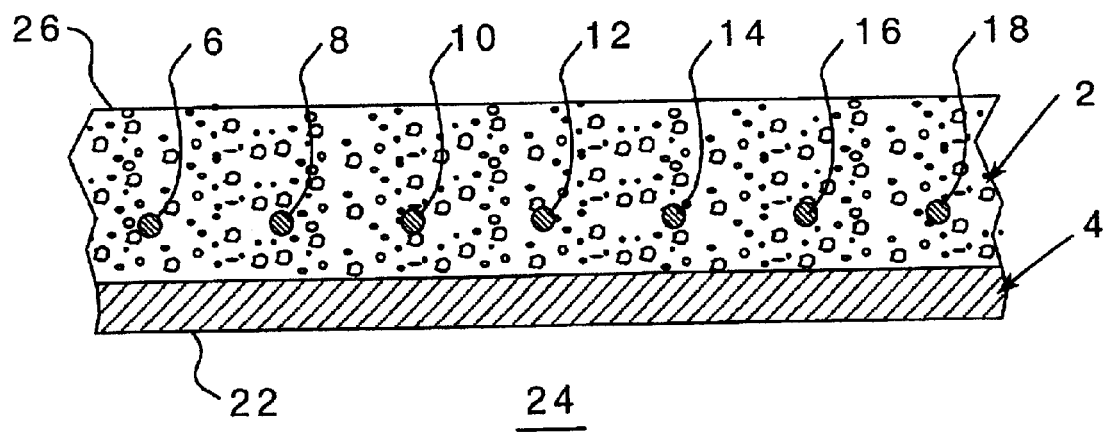
FIG. 1 is a schematic cross-sectional illustration of a concrete bridge deck containing metal reinforcing elements.

As shown schematically in FIG. 1, a layer of concrete 2, overlies and is supported by a deck member 4. The concrete in the form shown has a plurality of elongated, generally parallel, reinforcing bars 6, 8, 10, 12, 14, 16, 18. This assembly may be created in a conventional manner to provide the desired structure which, in the form shown, may be a bridge deck having an undersurface 22, exposed to air 24 and an upper surface 26, which may have undesired snow deposited thereon or ice formed thereon. Application of calcium chloride, sodium chloride or other chloride containing salts to the upper surface 26, or the overlying ice and snow (not shown) results in chloride penetration into the concrete interior and, if not inhibited, contact with the metal reinforcing bar 6–18 (even numbers only) which will generally be composed of steel to create the undesired corrosion.

For convenience of reference herein, the use of metal elements such as steel reinforcing bars 6–18 (even numbers only) will be discussed. It will be appreciated that corrosion inhibition of other types of metal elements such as those made of or coated with copper, tin or zinc, for example, may benefit from the present invention.

In one embodiment of the invention, there is not only provided free nitrite, which oxidizes ferrous ($Fe^{2+}$) to ferric ($Fe^{3+}$) ion to thereby effect precipitation of $Fe_2O_3$ to form an iron oxide barrier, but also provides means to sequester chloride which enters the concrete porosity by capturing the same in low solubility compounds.

As employed herein the term "low-solubility compounds" means, chloride-containing compounds exhibiting solubilities substantially below those of sodium chloride or calcium chloride, and shall include, but not be limited to, chloride-containing compounds, which at saturation in aqueous solutions permit less than about 1 kg of soluble chloride per cubic meter of concrete. A chloride level of about 1 kg/m$^3$ is considered the threshold level for corrosion.

In general, the invention contemplates the addition of any compound into which chloride ions would enter to produce a low solubility compound that sequesters the chloride.

An example of a preferred reaction of the present invention, which accomplishes both the objective of creating an iron oxide barrier and the sequestering of chloride, is shown in reaction (1).

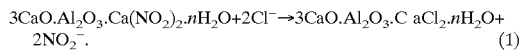

$$3CaO.Al_2O_3.Ca(NO_2)_2.nH_2O+2Cl^- \rightarrow 3CaO.Al_2O_3.CaCl_2.nH_2O+2NO_2^-. \quad (1)$$

In this example $3CaO.Al_2O_3.Ca(NO_2)_2.nH_2O$ wherein n=10 is added to fresh concrete as a particulate solid. The reaction that occurs is the chloride from the de-icing salts used on the hardened concrete reacts to produce Friedel's salt, which sequesters the chloride and, in addition, serves to release nitrite in order to oxidize any $Fe^{2+}$. In adding the particulate compound, $3CaO.Al_2O_3.Ca(NO_2)_2.nH_2O$, is added to the fresh concrete, it is preferred that in general about 3 to 88 pounds of the particulate solid will be added per cubic yard of hydrated fresh concrete, and preferably about 22 to 66 pounds per cubic yard. The exact amount will be influenced by the anticipated rates of chloride ingress into the concrete having the usual range of water-to-cement ratios, e.g., 0.35 to 0.50. The admixture may, if desired, be employed in concrete having lower water-to-cement ratios such as 0.25 to 0.35, for example, or higher ratios such as 0.5 to 0.9, for example. In general, the higher the anticipated rate of chloride ingress, the larger the amount of particulate composition employed. The compound is admixed with the hydrated fresh concrete to achieve substantially uniform distribution thereof. When the concrete sets, this constituent will be present in the concrete to receive and interact with chlorine from the icing salts that penetrates the pores of the concrete. This compound ($3CaO.Al_2O_3.Ca(NO_2)_2.nH_2O$) is generally stable over the range of pH values normally encountered in concrete. The resultant compound $3CaO.Al_2O_3.CaCl_2.10H_2O$ is a low solubility compound within which the chloride is sequestered. This compound, is more stable than the nitrite. Chloride will exchange for the nitrite thereby freeing the nitrite and sequestering the chloride. As a result, the concentration of chloride in the concrete at the surface of the steel, such as re-bars 6–18 (even numbers only) will be reduced as compared with concrete not containing the compound. This same reaction may be employed with the same result substituting $Fe_2O_3$ for $Al_2O_3$ in the starting material. This would result in the reaction $3CaO.Fe_2O_3.Ca(NO_2).nH_2O+2Cl^- \rightarrow 3CaO.Fe_2O_3.CaCl_2.nH_2O+2NO_2^-$ In lieu of providing the compound such as $3CaO.Al_2O_3.Ca(NO_2)_2.nH_2O$ in dry particulate form, it may be presented as a slurry with a pH of about 10 or greater with the particulate being present in the slurry in the range of about 5 to 60 weight percent and preferably about 10 to 35 weight percent. The slurry then would be admixed with the hydrated fresh concrete.

In lieu of introducing the particulate solid or slurry into hydrated fresh concrete, if desired, one may admix the particulate solid or slurry with one or more of the dry components of the concrete such as the cement, for example.

In lieu of the compound employed in reaction (1), other compounds may be used to create essentially the same reaction with the following differences. Among these compounds are, $3CaO.Fe_2O_3.Ca(NO_2)_2.nH_2O$ wherein n=0 to 24; $3CaO.Al_2O_3.Ca(NO_3)_2.nH_2O$ wherein n=0 to 24; and $3CaO.Fe_2O_3.Ca(NO_3)_2.nH_2O$ wherein n=0 to 24.

Also, $3Me(II)O.R_2O_3.Me(II)(anion)_2.nH_2O$ wherein Me(II) is one or more cations, $R_2$ is $Al_2$, $Fe_2$ or $Cr_2$, anion is $NO_2$, $NO_3$ or OH and n=0 to 24 may be employed. These approaches, in many instances, involve a substitution in the compound employed in equation (1) for the aluminum, for the calcium or the nitrite. As to the substitution for the nitrite, this would be replaced by nitrate in equation (1) $3CaO.Fe_2O_3.Ca(NO_3)_2.nH_2O$ or $(3CaO.Al_2O_3.Ca(NO_2)_2.nH_2O$. As stated hereinbefore, the anion may be divalent in which case the formula would be $3Me(II)O.R_2O_3.Me(II)(anion)nH_2O$ wherein n is 0 to 18 and preferably 10 to 18. In other compositions, nitrite could be replaced by carbonate, borate or other anions.

The nitrites have the advantage of sequestering chloride in addition to liberating a species capable of rapidly oxidizing ferrous ($Fe^{2+}$) ions near the surface of corroding seal to ferric ($Fe^{3+}$) ions to facilitate the formation of a protective layer of ferric oxide or hydroxide on the steel.

It is understood that the value of "n", meaning the number of waters of hydration, may vary, depending on the relative humidity to which the compounds are exposed.

Among the preferred compounds for use in the invention are, $3CaO.Al_2O_3.Ca(NO_2)_2.nH_2O$ and $3CaO.Fe_2O_3.Ca(NO_2)_2.nH_2O$ in terms of effectiveness for both chloride sequestration in concrete and protective oxide layer formation of metal embedded or in contact with concrete. It is preferred that n=0 to 24.

EXAMPLE 1

In order to provide more detailed information regarding the manner of synthesizing the compounds, examples will be provided.

In the synthesis of $3CaO.Al_2O_3.Ca(NO_2)_2.nH_2O$ wherein n=0 to 24, the following procedure may be followed.

In employing $3CaO.Al_2O_3$ the following process of synthesis may be employed:

(a)

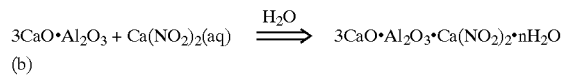

(b)

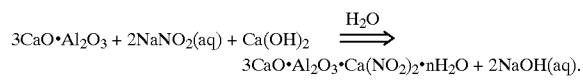

In employing $CaO.Al_2O_3$ the following process of synthesis may be employed:

(a)

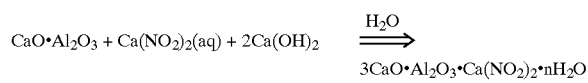

(b)

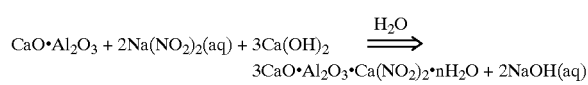

The presence NaOH does not appear to interfere with sequestration of chloride or with the action of nitrite on steel and, as a result, it is not necessary to remove the NaOH by washing the product compounds. Alternatively, the $3CaO.Al_2O_3$ and $Ca(NO_2)_2.nH_2O$ can be crystallized and separated from the NaOH solution.

In each of these two examples, the $Ca(OH)_2$ and calcium aluminate were employed as fine powders. $Ca(NO_2)_2$ and $NaNO_2$ are commercially available and highly soluble in water. While there are no critical particle size distributions, in general, it is preferred to have a particle size such that 99% of the powder passes through a 325 mesh sieve. Commercially available $Ca(OH)_2$ was employed as was commercially available $CaO.Al_2O_3$ with the latter being employed as a refractory cement. The synthesis in each case was carried out at room temperature by mixing the reactives with approximately 10 times their weight of water in suitable sealed containers. Their reaction occurred more rapidly if the contents of the containers were stirred or agitated. Optionally, if desired, grinding media such as Zirconia media, for example, may be placed in the containers.

The nitrate chloride sequestering compound $3CaO.Al_2O_3.Ca(NO_3)_2.nH_2O$ wherein n=0 to 24 can be produced in the manner described in the foregoing two examples employing tri-calcium aluminate or mono calcium aluminate and calcium hydroxide.

In using $3CaO.Al_2O_3$ as a starting material, the following process can be employed.

(a)

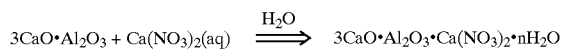

(b)

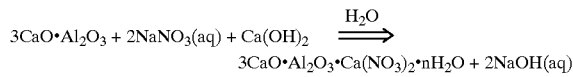

wherein n=0 to 24.

Employing $CaO.Al_2O_3$ as the starting material, the following process can be employed.

(a)

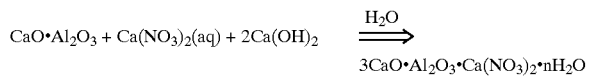

(b)

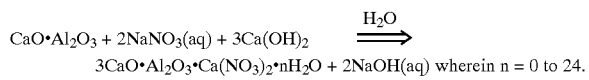

The presence NaOH does not appear to interfere with sequestration of chloride or with the action of nitrite on steel and, as a result, it is not necessary to remove the NaOH by washing the product compounds. Alternatively, the $3CaO.Al_2O_3.Ca(NO_3)_2.nH_2O$ and $Ca(NO_3)_2$ can be crystallized from the NaOH solution.

EXAMPLE 2

The phase $3CaO.Fe_2O_3.CaCl_2.nH_2O$ wherein n=10 has been created by reacting the precursors $3CaO.Fe_2O_3.Ca(NO_2)_2.nH_2O$ and $3CaO.Fe_2O_3.Ca(NO_3)_2.nH_2O$ with chloride. This indicates that chloride ions can be sequestered in the Fe analog of Friedel's salt ($3CaO.Al_2O_3.CaCl_2.10H_2O$). The compounds $3CaO.Fe_2O_3.Ca(NO_2)_2.nH_2O$ and $3CaO.Fe_2O_3.Ca(NO_3)_2.nH_2O$ have also been produced employing $2CaO.Fe_2O_3$. in the presence of supplementary Ca from $Ca(OH)_2$ and nitrite or nitrate from their calcium and/or sodium salts. $2CaO.Fe_2O_3$ may be produced by blending $Fe_2O_3$ and $CaCO_3$ in a molar ratio of about 2:1 followed by sintering this mixture at 1150° C. for approximately 1.5 hours. The mixture of CaO and $2CaO.Fe_2O_3$ is produced by calcining 3 moles of $CaCO_3$ with 1 mole of $Fe_2O_3$ at 1100° C. for approximately 1.5 hours. A variety of reaction times and temperatures can be used in the synthesis of this compound or this mixture. After cooling the $2CaO.Fe_2O_3$ or the mixture of $2CaO.Fe_2O_3$ and CaO were ground to an average particle size of approximately 10 microns using known comminution techniques.

EXAMPLE 3

The compounds $3CaO.Fe_2O_3.Ca(NO_3)_2.nH_2O$ may be produced by calcining 1 mole of $CaCO_3$ with 3 moles of $Fe_2O_3$ at 1100° C. for about 1.5 hours. This produces a mixture of CaO and $2CaO.Fe_2O_3$. This mixture is then ground and reacted with either $NaNO_3$ or $Ca(NO_3)_2$ under basic conditions. In the event that $NaNO_3$ is used, it is preferred to add supplemental calcium. This may be added as CaO or $Ca(OH)_2$ for example.

With respect to compound $3Me(II)O.R_2O_3Me(II)$ $(anion)_2.nH_2O$ wherein $R_2$ is $Al_2$, $Fe_2$ or $Cr_2$ anion is $NO_2$, $NO_3$ or OH and n is 0 to 24 where Me(II) is a cation such as Ca, but may be partially substituted by other divalent cations or may be completely substituted by other divalent cations such as Ba, Sr, Mn, Zn, for example. For some compositions divalent anions such as carbonate or borate may be used.

Figure 2:
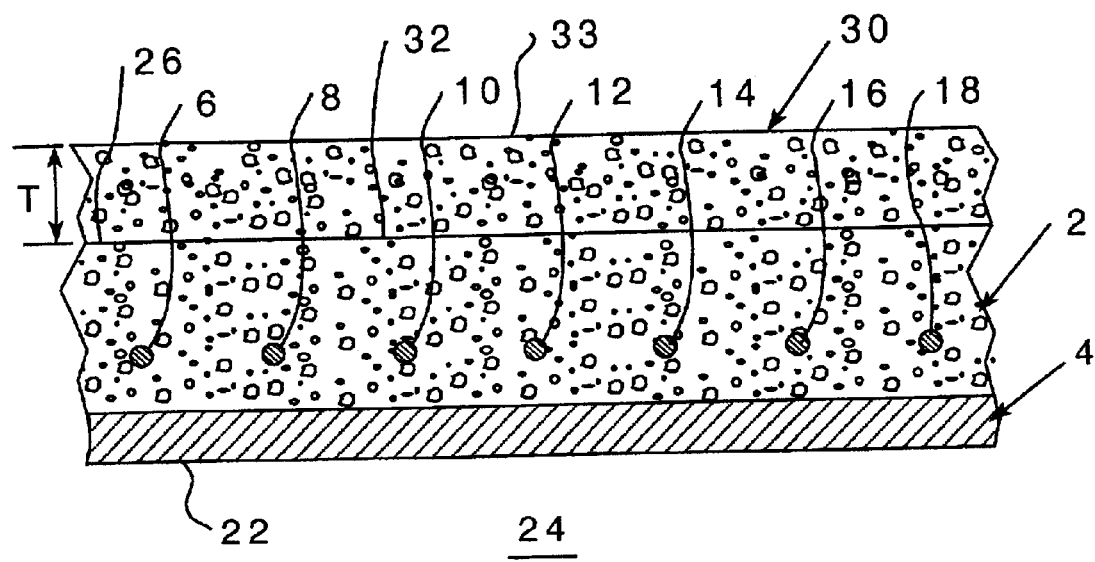
FIG. 2 is a schematic cross-sectional illustration similar to FIG. 1, but showing a construction having an overlay containing the chloride sequestering composition.

Referring to FIG. 2, wherein an existing concrete structure 2 having reinforcing metal elements 6–18 (even numbers only) is shown with an underlying deck member 4, which may or may not be present in connection with the rehabilitation of existing concrete structures as provided in this embodiment of the invention. An overlay 30, which in the form illustrated, it is concrete containing a compound usable in the present invention to sequester chloride ions with or without the capability of releasing nitrites to establish an oxide coating on the metal reinforcing member 6–18 is shown. This overlay 30 preferably has a porosity similar, or in excess of, to that of the concrete in the structure so as to permit free movement of chloride ions and nitrites therebetween. The thickness T of the overlay 30 may be in the order of 0.5 to 10 inches with a preferred thickness being about 1–4 inches.

The overlay 30 may be established in situ and self-bonded to the upper surface 32 of the concrete structure. In the alternative, the overlay 30 may be a preformed panel containing the compound which may be secured to the concrete structure 2 by any desired means such as an adhesive material preferably provide a continuously between the overlay 30 and the concrete layer 2 without interfering meaningfully with porosity in the interchange between the two structural elements or may be provided in certain locations leaving other areas for surface-to-surface contact between the overlay 30 and the concrete member 2. A suitable adhesive for this purpose is latex.

In lieu of the concrete material employed in overlay 30, other suitable materials having the desired strength, porosity and other characteristics needed for the present invention, may be employed. Among these are asphaltic materials, clay and clay-like materials and other cement materials including but not limited to Portland cements, blends of Portland cement with other materials such as fly-ash, slag or silica fume, calcium aluminate cements and mortars.

The overlay 30 provides a number of beneficial actions, which facilitate rehabilitation of the existing concrete structure 2. First of all, chloride will migrate out of the concrete 2 in response to the concentration gradient produced in the pore structure of the concrete 2, the pore structure across the interface with the overlay 30 and with the pore structure of the overlay 30 itself. The admixture in the overlay 30 sequestered chloride ions that enter the overlay 30. Nitrite will migrate from the overlay 30 into the concrete 2 and toward the reinforcing steel 6–18 (even numbers only) in response to the concentration ingredient produced in the pore structure of the concrete itself, in the pore structure across the interface at surface 32 between the concrete 2 and overlay 30 and within the pore structure of the overlay 30 itself. The nitrite facilitates formation of a protective coating on the metal reinforcing elements 6–18, which may be composed of steel. All of this is accomplished without requiring prior art external electric current application. The system, therefore, results in passive chloride extraction.

If desired, in order to enhance the efficiency of maintaining the desired continuous moisture path, through which the chloride ions and nitrite can move, additional wetting may be applied and a low porosity overlay (not shown) overlying the upper surface 33 of the overlay 30 may be provided in order to seal the moisture in the structure. Also, rain may enhance such moisture paths. The low porosity overlay may be applied as a self-bonding coating established in situ or as a preformed element secured to surface 33.

Figure 3:
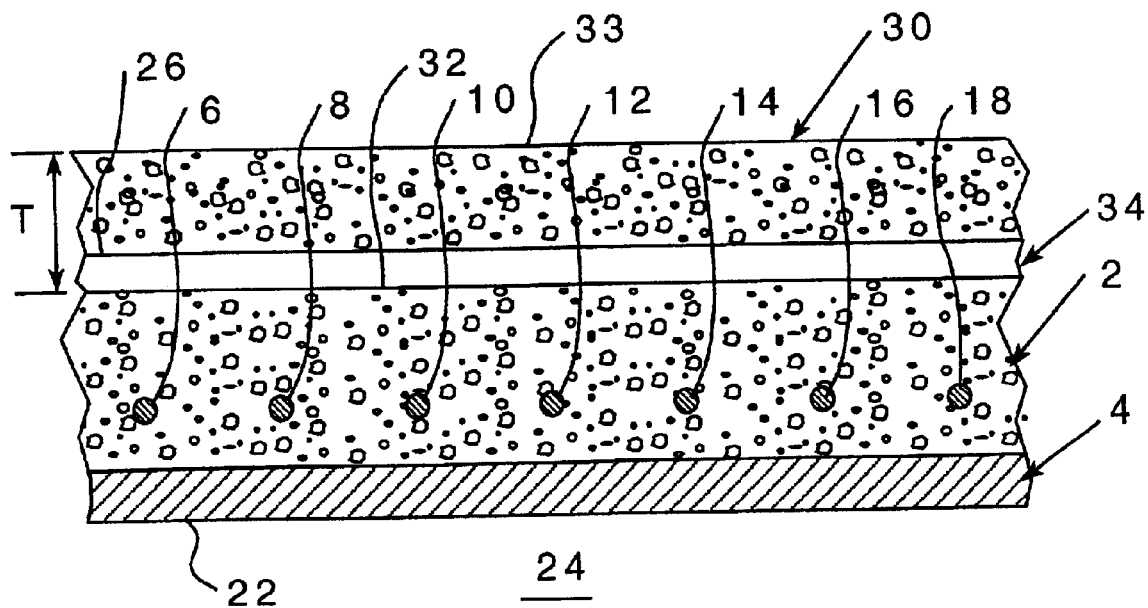
FIG. 3 is a schematic cross-sectional illustration similar to FIG. 2 except that the overlay consists of a slurry adjacent to the concrete structure and an overlaying material.

In employing the process in connection with FIG. 2 and the embodiment describing in connection with FIG. 3, the compounds previously disclosed herein may be employed. It will be understood that those compounds which both sequester chloride ions and release nitrite will result in both the sequestration of chloride ion and releasing of nitrite serving to create the protective oxide layer around the metal reinforcing members 6–18 in the manner described herein.

Referring to FIG. 3, there is shown an embodiment similar to that of FIG. 2 except that the overlay 30 has a lower portion which is a separately formed slurry 34 disposed between the upper surface 32 of existing concrete structure 2 and the upper portion of overlay 30 with the overall thickness of the overlay 30 remaining within the range of thickness T. The slurry will be porous to facilitate migration of chloride ions and nitrite between it and the underlying concrete structure 2. The porosity of the slurry 34 will be such as to maintain communication with the underlying concrete 2. The slurry 34, which may be employed alone (not shown) or in combination with another portion of overlay 30 as shown in FIG. 3, will contain the compound employed to effect the objectives of the invention and may also include cements and sand as desired. In cases where slurry 34 is employed preferably alone it has a thickness of about ⅛ inch to 4 inches. In general, the water to solids ratio of the slurry will facilitate its being pumpable or spreadable with the capability of hardening with the consumption of free water during formation of $3CaO.Al_2O_3.Ca(NO_2)_2.nH_2O$, wherein n=0 to 24. The water to solids ratios may be about 0.25–5 and preferably about 0.4 to 1.0. The slurry is pumped, sprayed, troweled or otherwise placed on the surface 32 to create slurry layer 34. The thickness of the slurry preferably will be in the range of about 0.125 to 4 inches and if sand is not present in the composition, will preferably be in the range of about 0.25 to 0.5 inch. With sand, the range is preferably about 0.5 to 1.0 inch. It will be appreciated that if in lieu of the composition previously recited in this paragraph, the composition $3CaO.Al_2O_3.Ca(NO_3)_2.nH_2O$, wherein n=0 to 24 were employed as nitrate is not regarded as a corrosion inhibitor in the sense of creating an oxide protective coating on the metal elements, this compound would provide solely a means for removing chloride ions from the concrete, but not inhibition of corrosion of embedded steel or other metal. The amount of the compound employed in a specific installation can be determined by the amount of chloride that has entered the concrete structure and can be determined readily by those skilled in the art.

Figure 4:
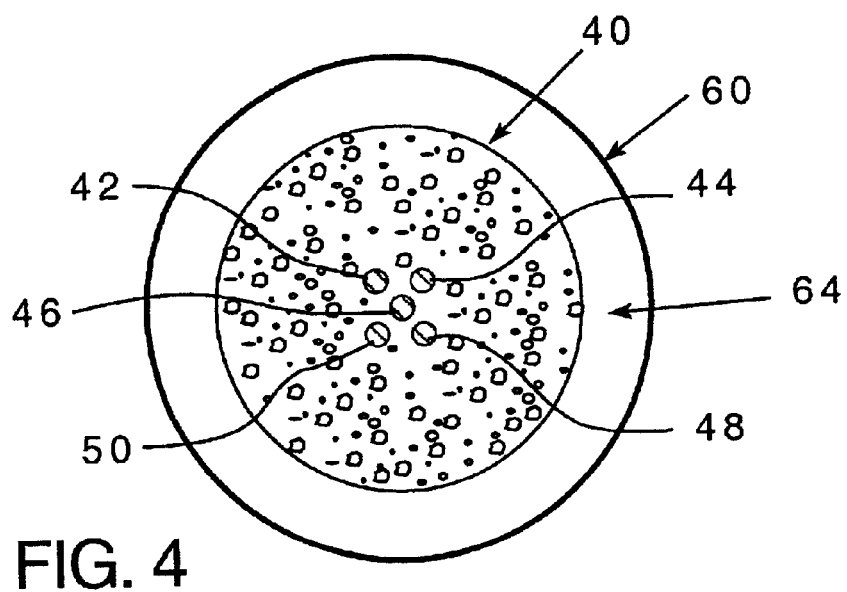
FIG. 4 illustrates a cross-sectional illustration looking downward on a concrete piling which is to be rehabilitated through the system of the present invention.

Referring to an embodiment wherein the vertical concrete structural be remediated, FIG. 4 shows a piling 40 which is generally vertically oriented and may be located under water. It has a plurality of elongated steel reinforcing members 42, 44, 46, 48, 50 embedded therein. A continuous clamshell 60 has been placed around the piling 40 to create an annular region 64 within which a slurry of the present invention may be introduced. The clamshell 60 may be in segments which are longitudinally adjacent to each other and secured to each other. They may be joined by bolts or other suitable mechanical means such as cables, or clamps. The annular region 64 has the slurry introduced after the clamshell 60 is placed in the space with the slurry being pumped in to displace water within an annular region 64. In other respects, the system of the invention performs in the identical manner as previously described herein.

It will be appreciated that depending upon the specific nature of the concrete structure to be remediated and the location and nature of the environment in which it is being employed, certain preferred refinements of this embodiment of the invention may be employed. For example, in situations where vehicular or foot traffic may be imposed on the concrete structure and an overlay with high strength should to be provided. Also, for example, in situations were the concrete structure will be subjected to a freeze-thaw cycles certain preferred approaches may serve to minimize the effects of the same. For example, an air-entrained admixture may be provided in slurry 34 of FIG. 3 to counteract the effects of the freeze-thaw cycles. Such an approach might involve adding a chemical in a small amount, such as about 0.1% of the weight of the concrete, for example, to produce small bubbles when the concrete freezes the water in the porosity migrates into the bubbles and freezes harmlessly.

An alternate way of minimizing the effect of the freeze-thaw cycle would be maintain a high ionic strength liquid in the porosity of the slurry. The more ions dissolved in water the lower the freezing temperature. For example, soluble nitrite salts such as calcium nitrite, calcium nitrite, sodium nitrate, or sodium nitrite may be employed for this purpose and function to increase the concentration ingredient in nitrite and thereby facilitate movement of nitrite into the concrete.

Another compound suitable for use in the present invention would involve the use of the source of aluminum not coming from cement. This would result from the use of sodium aluminate $NaAlO_4$. This may be accomplished by the following approaches.

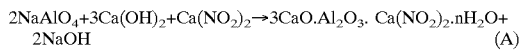

$2NaAlO_4 + 3Ca(OH)_2 + Ca(NO_2)_2 \rightarrow 3CaO.Al_2O_3 \cdot Ca(NO_2)_2 \cdot nH_2O + 2NaOH$ (A)

wherein n=0 to 24 and preferably 0 to 12
or

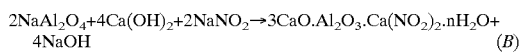

$2NaAl_2O_4 + 4Ca(OH)_2 + 2NaNO_2 \rightarrow 3CaO.Al_2O_3 \cdot Ca(NO_2)_2 \cdot nH_2O + 4NaOH$ (B)

wherein n=0 to 24 and preferably 0 to 12.

In certain embodiments of the invention, the aluminum constituent was provided in alumina form from calcium aluminate cement ($CaO.Al_2O_3$), or tricalcium aluminate cement ($3CaO.Al_2O_3$). Other sources may be employed. The alternate materials could be a source of alumina, aluminate or aluminum hydroxide having sufficient reactivity to form the desired admixture. For example, an alumina selected from the group consisting of alpha alumina, flash calcined alumina, and transition aluminas may be employed. Transition aluminas include gamma alumina, theta alumina, and kappa alumina, for example. Other calcium aluminates such as $CaO.2Al_2O_3$ or $CaO.6Al_2O_3$ for example, could be employed. Suitable aluminates would include a source containing the $AlO_2$ ion and other alumina salts. Among the suitable aluminates are sodium aluminate and potassium aluminate.

Among other sources are organo-aluminates, such as sec-butoxide for example. Other suitable sources are aluminum hydroxides such as non-crystalline gels, forms of $Al(OH)_3$ such as gibbsite or bayerite, forms of AlOOH such as boehmite or diaspore and other hydrated aluminas such as tohdite ($5Al_2O_3.H_2O$).

In another embodiment of the invention, a slurry or preformed panel containing a source of calcium such as $Ca(OH)_2$ and a source of alumina such as $CaO.Al_2O_3$ or $3CaO.Al_2O_3$ which is either premixed with the calcium source or applied separately, is applied over a concrete structure to sequester chloride ions from the concrete structure. An example of such a method of producing such an overlay is the following reaction.

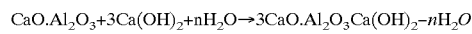

$CaO.Al_2O_3 + 3Ca(OH)_2 + nH_2O \rightarrow 3CaO.Al_2O_3 Ca(OH)_2 \cdot nH_2O$ wherein n=0 to 24 and preferably 12 to 18.
The reaction product will convert to $3CaO.Al_2O_3Ca(Cl)_2.nH_2O$ wherein n=0 to 24 when it sequesters the chloride ion from the concrete structure.

It will be appreciated, therefore, that the present invention has provided an effective method and related compounds and structure for incorporating into concrete containing metal elements a class of compounds which will effectively resist undesired corrosion of the metallic compounds by both sequestration of chloride ions and provide a coating on the metallic elements, in some instances such as reactions that release nitrite. Other reactions, such as those which release nitrate alone, occur without providing such a coating.

It will be appreciated that the compositions of the present invention may be combined with fresh concrete as defined herein in many ways. For example, the composition may be combined in solid form (a) with concrete in a plastic state (b) with ready mix concrete at a job site (c) at the time of batching or (d) inter-blended with mineral admixtures of materials such as slag, fly ash, or silica fume, or (e) may be interblended with cement, for example. It may also be combined in slurry form in a suitable liquid such as $Ca(OH)_2$ solution at the time of batching, for example. These approaches are all within the scope of the present invention.

In another embodiment of the invention, the chloride ion sequestering component or chloride ion sequestering and nitrite releasing compound may be created in situ. The compound $3CaO.Al_2O_3.Ca(NO_2)_2.nH_2O$ and similar compounds having the desired chloride ion sequestering or chloride ion sequestering and nitrite releasing capability may be created in this manner.

One manner of effecting creation of the desired compound in situ would be to add a solution containing $NaAlO_4$, $Ca(NO_2)_2$ and/or $NaNO_2$ to mixing water to be employed to prepare fresh concrete. Alternatively, the added materials could be mixed directly with the water. During cement hydration, Ca(OH)₂ would be produced and would react with the added materials such as in reactions A and B. This results in in situ creation of a compound that both sequester chloride ion and releases nitrite.

As another approach, in lieu of relying on the concrete hydration to provide the $Ca(OH)_2$, it may be admixed with one or more of $NaAlO_4$, $Ca(NO_2)_2$ and $NaNO_2$ and, be added to fresh concrete or to the mixing water employed to prepare the fresh concrete.

Another approach to in situ creation would be to add calcium aluminate cement along with $NaNO_2$ or $Ca(NO)_2$ with or without $Ca(OH)_2$ to the concrete making materials to create $3CaO.Al_2O_3.Ca(NO_2)_2.nH_2O$ in situ wherein n=0 to 24 and preferably 12 to 18.

These general approaches may be employed in creating a slurry for remediation of concrete structures by mixing $Ca(OH)_2$ with $NAlO_4$, $Ca(NO_2)_2$ and/or $NaNO_2$ and providing the same on existing concrete. This same approach can be employed in creating pre-formed overlay panels for use in remediation.

The hereinbefore described alternate sources of aluminum may be employed in this in situ embodiment along with $NaNO_2$ and/or $Ca(NO_2)_2$.

An alternate approach to the in situ embodiment would be to employ nitrate salts such as $NaNO_3$ or $Ca(NO_3)_2$ which would produce a compound that sequestered chloride ions, but would not yield nitrites which would result in an oxide protective layer on the metal elements.

In another embodiment of the invention employed to remediate a concrete structure, a solution containing a soluble source of alumina, such as $NaAl_2O_4$, for example, is combined within a solution, which may be an aqueous solution, with at least one material selected from the group consisting of $Ca(NO_2)_2$ and $NaNO_2$. This solution is introduced into the pores of the concrete structure to effect chlorine ion sequestration within the concrete structure. The components would react with each other and the $Ca(OH)_2$ contained within the concrete in order to produce the corrosion inhibiting compound. The nitrite which results from the reaction will serve to effect the creation of oxide protective layer on the metal elements in the manner described hereinbefore. The solution may be introduced under pressure or by capillary suction after placing the solution on the concrete surface, for example, thereby creating a pressurized introduction into the pores. In the alternative, while not preferred the solution may be allowed to infiltrate the pores under the influence of gravity.

It will fiber be appreciated that the present invention provides a system for rehabilitation of an existing concrete structure through an overlay which contains compounds which serve to sequester chloride ions. It may also establish an oxide barrier layer on metal structural members associated with the concrete structure.

Certain preferred compounds have been disclosed herein, along with their method of use and resultant structure.

Whereas particular embodiments have been described herein for purposes of illustration, it will be evident to those skilled in the art that numerous variations of the details may be made without departing from the invention as defined in the appended claims.

What is claimed is:

1. A method of resisting corrosion of metals in a concrete structure comprising, creating a slurry containing at least one compound capable of sequestering chloride ions selected from the group consisting of $3Me(II)O.R_2O_3.Me(II)(anion)_2.nH_2O$ where n=0 to 24 and $3Me(II)O.R_2O_3.Me(II)(anion).nH_2O$ where n=0 to 18, where Me(II) is one or more divalent cations selected from the group consisting of Ca, Ba, Sr, Mn and Zn; $R_2$ is $Al_2$, $Fe_2$ or $Cr_2$; and anion is $NO_2$, $NO_3$, $CO_3$, $BO_4$ or OH, but when Me(II) is Ca, $R_2$ is not $Al_2$, positioning said slurry adjacent to said concrete structure, and sequestering chloride ions in said compound.

2. The method of claim 1 including creating an overlay on said concrete structure with said slurry and allowing said slurry to set.

3. The method of claim 2 including securing said overlay to said concrete structure to permit chloride ion exchange therebetween.

4. The method of claim 3 including applying a preformed panel over said overlay.

5. The method of claim 4 including providing said preformed panel with lower porosity than said slurry layer.

6. The method of claim 2 including employing in said slurry at least one material selected from the group consisting of $NaAlO_4$, $Ca(NO_2)_2$ and $NaNO_2$.

7. The method of claim 2 including employing $Ca(OH)_2$ in said compound.

8. The method of claim 2 including employing in said compound an aluminum constituent selected from the group consisting of alumina, aluminate and alumina hydroxide.

9. The method of claim 8 including employing in said source of aluminum a material other than $CaO.Al_2O_3$ and $3CaO.Al_2O_3$.

10. The method of claim 2 including employing as said compound a compound capable of establishing a corrosion resistant oxide layer on embedded metal elements.

11. The method of claim 2 including employing a nitrite-containing compound as said compound.

12. The method of claim 2 including employing as said compound a compound selected from the group consisting of $3CaO.Fe_2O_3.Ca(NO_2)_2.nH_2O$; and $3CaO.Fe_2O_3.Ca(NO_3)_2.nH_2O$ wherein n=0 to 24.

* * * * *

UNITED STATES PATENT AND TRADEMARK OFFICE
CERTIFICATE OF CORRECTION

PATENT NO. : 6,755,925 B1
APPLICATION NO. : 10/047226
DATED : June 29, 2004
INVENTOR(S) : Paul W. Brown It is certified that error appears in the above-identified patent and that said Letters Patent is hereby corrected as shown below:

Col. 3, lines 9, 10, 11 "$3CaO.Al_2O_3.Ca(NO_2)_2.nH_2O$; $3CaO.Al_2O_3.Ca(No_3)_2.nH_2O$; and $3CaO.Fe_2O_3.Ca(NO_2)_2.nH_2O$" should read -- $3CaO \cdot Al_2O_3 \cdot Ca(NO_2)_2 \cdot nH_2O$; $3CaO \cdot Al_2O_3 \cdot Ca(NO_3)_2 \cdot nH_2O$; and $3CaO \cdot Fe_2O_3 \cdot Ca(NO_2)_2 \cdot nH_2O$--.

Col. 3, line 17 "$3Me(II)O.R_2O_3.Me(II)(anion)_2.nH_2O$" should read --$3Me(II)O \cdot R_2O_3 \cdot Me(II)(anion)_2 \cdot nH_2O$--.

Col. 3, line 22, "$Me(II)O.R_2O_3Me(II)(anion)nH_2O$" should read --$Me(II)O \cdot R_2O_3Me(II)$ $(anion)nH_2O$--.

Col. 4, line 1, "$Fe2+$ to a $Fe^3+$" should read --"$Fe^{2+}$ to a $Fe^{3+}$--.

Col. 6, line 12 and 13, "$3CaO.Al_2O_3.Ca(NO_2)_2.nH_2O+2C1 \rightarrow 3CaO.Al_2O_3. CaCl_2.nH_2O+2NO_2^-$" should read --$3CaO \cdot Al_2O_3 \cdot Ca(NO_2)_2 \cdot nH_2O+2Cl \Rightarrow 3CaO \cdot Al_2O_3 \cdot CaCl_2 \cdot nH_2O+2NO_2^-$--.

Col. 6, lines 15 and 21, "$3CaO.Al_2O_3.Ca(NO_2)_2.nH_2O$" should read --$3CaO \cdot Al_2O_3 \cdot Ca(NO_2)_2 \cdot nH_2O$--.

Col. 6, line 38 "$(3CaO.Al_2O_3.Ca(NO_2)_2.nH_2O)$" should read --$(3CaO \cdot Al_2O_3 \cdot Ca(NO_2)_2 \cdot nH_2O)$--.

Col. 6, line 41 "$3CaO.Al_2O_3.CaCl_2.1OH_2O$" should read --$3CaO \cdot Al_2O_3 \cdot CaCl_2.1OH_2O$--.

Col. 6, lines 51 and 52, "$3CaO.Fe_2O_3.Ca(NO_2).nH_2O+2C1^- \rightarrow 3CaO.Fe_2O_3. CaCl_2.nH_2O + 2NO_2^-$", should read --$3CaO \cdot Fe_2O_3 \cdot Ca(NO_2) \cdot nH_2O+2Cl^- \Rightarrow 3CaO \cdot Fe_2O_3 \cdot CaCl_2 \cdot nH_2O + 2NO_2^-$ --.

Col. 6, line 54, "$3CaO.Al_2O_3.Ca(NO_2)_2.nH_2O$", should read --$3CaO \cdot Al_2O_3 \cdot Ca(NO_2)_2 \cdot nH_2O$--.

Col. 6, line 67, "$3CaO.Fe_2O_3.Ca(NO_2)_2.nH_2O$", should read --$3CaO \cdot Fe_2O_3 \cdot Ca(NO_2)_2 \cdot nH_2O$--.

Col. 7, line 1, "24; $3CaO.Al_2O_3.Ca(NO_3)_2.nH_2O$ wherein n=O to 24; and $3CaO.Fe_2O_3.Ca(NO_3)_2.nH_2O$ wherein n=O to 24.", should read
--24;
   $3CaO \cdot Al_2O_3 \cdot Ca(NO_3)_2 \cdot nH_2O$ wherein n=O to 24; and
   $3CaO \cdot Fe_2O_3 \cdot Ca(NO_3)_2 \cdot nH_2O$ wherein n=O to 24.--.

UNITED STATES PATENT AND TRADEMARK OFFICE
CERTIFICATE OF CORRECTION

PATENT NO.       : 6,755,925 B1
APPLICATION NO.  : 10/047226
DATED            : June 29, 2004
INVENTOR(S)      : Paul W. Brown It is certified that error appears in the above-identified patent and that said Letters Patent is hereby corrected as shown below:

Col. 7, line 3, "3Me (II) O.$R_2O_3$.Me(II)(anion)$_2$.n$H_2$O", should read --3Me(II)O • $R_2O_3$ • Me(II)(anion)$_2$ • n$H_2$O--.

Col. 7, lines 10-11, "3CaO.$Fe_2O_3$.Ca($NO_3$)$_2$.n$H_2$O or (3CaO.$Al_2O_3$.Ca($NO_2$)$_2$.n$H_2$O.", should read --3CaO • $Fe_2O_3$ • Ca($NO_3$)$_2$ • n$H_2$O or (3CaO • $Al_2O_3$ • Ca($NO_2$)$_2$ • n$H_2$O.--.

Col. 7, line 13, "O.$R_2O_3$.Me(II)", should read, --O • $R_2O_3$ • Me(II)--.

Col. 7, line 25 "3CaO.$Al_2O_3$.Ca($NO_2$)$_2$.n$H_2$O", should read --3CaO • $Al_2O_3$ • Ca($NO_2$)$_2$ • n$H_2$O--.

Col. 7, line 25-26, "3CaO.$Fe_2O_3$.Ca($No_2$)$_2$.n$H_2$O" should read --3CaO • $Fe_2O_3$ • Ca($NO_2$)$_2$ • n$H_2$O--.

Col. 8, line 1, "3CaO.$Al_2O_3$", should read --3CaO • $Al_2O_3$--.

Col. 8, line 1, "Ca($NO_2$)$_2$.n$H_2$O", should read --Ca($NO_2$)$_2$ • n$H_2$O--.

Col. 8, line 10, "CaO.$Al_2O_3$", should read -- CaO • $Al_2O_3$"--.

Col. 8, line 19, "3CaO.$Al_2O_3$.Ca($NO_3$)$_2$.n$H_2$O" should read --3CaO • $Al_2O_3$ • Ca($NO_3$)$_2$ • n$H_2$O--.

Col. 8, line 23, "3CaO.$Al_2O_3$" should read --3CaO • $Al_2O_3$--.

Col. 8, line 37, "CaO.$Al_2O_3$" should read -- CaO • $Al_2O_3$--

Col. 8, line 55, "3CaO.$Al_2O_3$.Ca($NO_3$)$_2$.n$H_2$O" should read --3CaO • $Al_2O_3$ • Ca($NO_3$)$_2$ • n$H_2$O--.

Col. 8, line 59, "3CaO.$Fe_2O_3$.$CaCl_2$.n$H_2$O"should read --3CaO • $Fe_2O_3$ • $CaCl_2$ • n$H_2$O--.

Col. 8, line 60-61 and 64 , "3CaO.$Fe_2O_3$.Ca($NO_2$)$_2$.n$H_2$O" should read --3CaO • $Fe_2O_3$ • Ca($NO_2$)$_2$ • n$H_2$O--.

Col. 8, line 61 and 65, "3CaO.$Fe_2O_3$.Ca($NO_3$)$_2$.n$H_2$O", should read --3CaO • $Fe_2O_3$ • Ca($NO_3$)$_2$ • n$H_2$O--.

UNITED STATES PATENT AND TRADEMARK OFFICE
CERTIFICATE OF CORRECTION

PATENT NO. : 6,755,925 B1
APPLICATION NO. : 10/047226
DATED : June 29, 2004
INVENTOR(S) : Paul W. Brown It is certified that error appears in the above-identified patent and that said Letters Patent is hereby corrected as shown below:

Col. 8, line 63, "($3CaO.Al_2O_3.CaCl_2.10H_2O$)" should read
--($3CaO \cdot Al_2O_3 \cdot CaCl_2 \cdot 10H_2O$)--.

Col. 8, line 66, "$2CaO.Fe_2O_3$" should read --$2CaO \cdot Fe_2O_3$--.

Col. 9, lines 1 and 4, "$2CaO.Fe_2O_3$" should read --$2CaO \cdot Fe_2O_3$--.

Col 9, line 9, both instances "$2CaO.Fe_2O_3$" should read --$2CaO \cdot Fe_2O_3$--.

Col. 9, line 13, "$3CaO.Fe_2O_3.Ca(NO_3)_2.nH_2O$" should read
--$3CaO \cdot Fe_2O_3 \cdot Ca(NO_3)_2 \cdot nH_2O$--.

Col. 9, line 16, "$2CaO.Fe_2O_3$" should read --$2CaO \cdot Fe_2O_3$--.

Col. 9, line 21 and 22, "$3Me(II)O.R_2O_3Me(II)(anion)_2.nH_2O$" should read
--$3Me(II)O \cdot R_2O_3Me(II)(anion)_2 \cdot nH_2O$--.

Col. 9, line 41, "ther" should read --there- --.

Col. 10, line 54 and 55, "$3CaO.Al_2O_3.Ca(NO_2)_2.nH_2O$" should read
--$3CaO \cdot Al_2O_3 \cdot Ca(NO_2)_2 \cdot nH_2O$--.

Col. 10, line 64 and 65 "$3CaO.Al_2O_3.Ca(NO_3)_2.nH_2O$" should read
--$3CaO \cdot Al_2O_3 \cdot Ca(NO_3)_2 \cdot nH_2O$--.

Col. 11, lines 56 and 57,
"$2NaAlO_4+3Ca(OH)_2+Ca(NO_2)_2 \rightarrow 3CaO.Al_2O_3.Ca(NO_2)_2.nH_2O+2NaOH$" should
read --$2NaAlO_4+3Ca(OH)_2+Ca(NO_2)_2 \rightarrow 3CaO \cdot Al_2O_3 \cdot Ca(NO_2)_2 \cdot nH_2O+ 2NaOH$--.

Col. 11, lines 61 and 62,
"$2NaAl_2O_4+4Ca(OH)_2+2NaNO_2 \rightarrow 3CaO.Al_2O_3.Ca(NO_2)_2.nH_2O+4NaOH$" should
read --$2NaAl_2O_4+4Ca(OH)_2+2NaNO_2 \rightarrow 3CaO \cdot Al_2O_3 \cdot Ca(NO_2)_2 \cdot nH_2O+ 4NaOH$--.

Col. 12, line 9, "$CaO.2Al_2O_3$ or $CaO.6Al_2O_3$" should read
-- $CaO \cdot 2Al_2O_3$ or $CaO \cdot 6Al_2O_3$ --.

Col. 12, line 11, "$AlO_2$" should read --$AlO_2^-$--.

UNITED STATES PATENT AND TRADEMARK OFFICE
CERTIFICATE OF CORRECTION

PATENT NO.       : 6,755,925 B1
APPLICATION NO. : 10/047226
DATED            : June 29, 2004
INVENTOR(S)      : Paul W. Brown It is certified that error appears in the above-identified patent and that said Letters Patent is hereby corrected as shown below:

Col. 12, line 19, "($5Al_2O_3.H_2O$)" should read --($5Al_2O_3 \bullet H_2O$)--.

Col. 12, line 22, "$CaO.Al_2O_3$" should read --$CaO \bullet Al_2O_3$--.

Col. 12, line 23, "$3CaO.Al_2O_3$" should read --$3CaO \bullet Al_2O_3$--.

Col. 12, line 29, "$CaO.Al_2O_3+3Ca(OH)_2+nH_2O \rightarrow 3CaO.Al_2O_3Ca(OH)_2\text{-}nH_2O$" should read --$CaO \bullet Al_2O_3+3Ca(OH)_2+nH_2O \rightarrow 3CaO \bullet Al_2O_3 \bullet Ca(OH)_2\text{-}nH_2O$--.

Col. 12, lines 32 and 33, "$3CaO.Al_2O_3Ca(Cl)_2.nH_2O$" should read --$3CaO \bullet Al_2O_3 \bullet Ca(Cl)_2 \bullet nH_2O$--.

Col. 12, line 59, "$3CaO.Al_2O_3.Ca(NO_2)_2.nH_2O$" should read --$3CaO \bullet Al_2O_3 \bullet Ca(NO_2)_2 \bullet nH_2O$--.

Col. 13, line 48, "fiber" should read --further--.

Col. 14, lines 8, "$3Me(II)O.R_2O_3.Me(II)(anion)_2nH_2O$" should read --$3Me(II)O \bullet R_2O_3 \bullet Me(II)(anion)_2nH_2O$--.

Col. 14, line 9, "$3ME(II)O.R_2O_3.Me(II)(anion).nH_2O$" should read --$3ME(II)O \bullet R_2O_3 \bullet Me(II)(anion) \bullet nH_2O$--.

UNITED STATES PATENT AND TRADEMARK OFFICE
CERTIFICATE OF CORRECTION

PATENT NO.       : 6,755,925 B1
APPLICATION NO. : 10/047226
DATED            : June 29, 2004
INVENTOR(S)      : Paul W. Brown It is certified that error appears in the above-identified patent and that said Letters Patent is hereby corrected as shown below:

Col. 14, line 57, "$3CaO.Fe_2O_3.Ca(NO_2)_2.nH_2O$; and $3CaO.Fe_2O_3.Ca(NO_3)_2.nH_2O$" should read, --$3CaO \cdot Fe_2O_3 \cdot Ca(NO_2)_2 \cdot nH_2O$ ; and $3CaO \cdot Fe_2O_3 \cdot Ca(NO_3)_2 \cdot nH_2O$--.

Signed and Sealed this

Eleventh Day of September, 2007

JON W. DUDAS
*Director of the United States Patent and Trademark Office*